United States Patent Office 3,151,514
Patented Oct. 6, 1964

3,151,514
ROTARY CUTOFF DEVICE HAVING A BLADE ACTUATED BY ELECTROMAGNETIC MEANS
Thomas J. Noveske, Cleveland, Ohio, assignor, by mesne assignments, to Ronald M. Stillman, Great Neck, N.Y.
Filed Oct. 9, 1961, Ser. No. 143,645
6 Claims. (Cl. 83—354)

The present invention relates to cutting devices and, in particular, to devices for cutting pieces of predetermined length from the leading end of material which is being advanced.

The principal object of the present invention is the provision of a new and improved cutting device, of the above noted type, which is compact and durable, easily serviced, and which will operate efficiently at a high speed.

Another object of the invention is the provision of a new and improved cutting device, of the above noted type, having a rotatable member provided with a cutting blade or member movable from a closed or inoperative position into an open or cutting position and held in one position by centrifugal force moved by electromagnetic means into its other position in combination with control means which causes the cutting blade to sever predetermined length of material from the leading end of material fed by the rotatable member.

Figure 1:
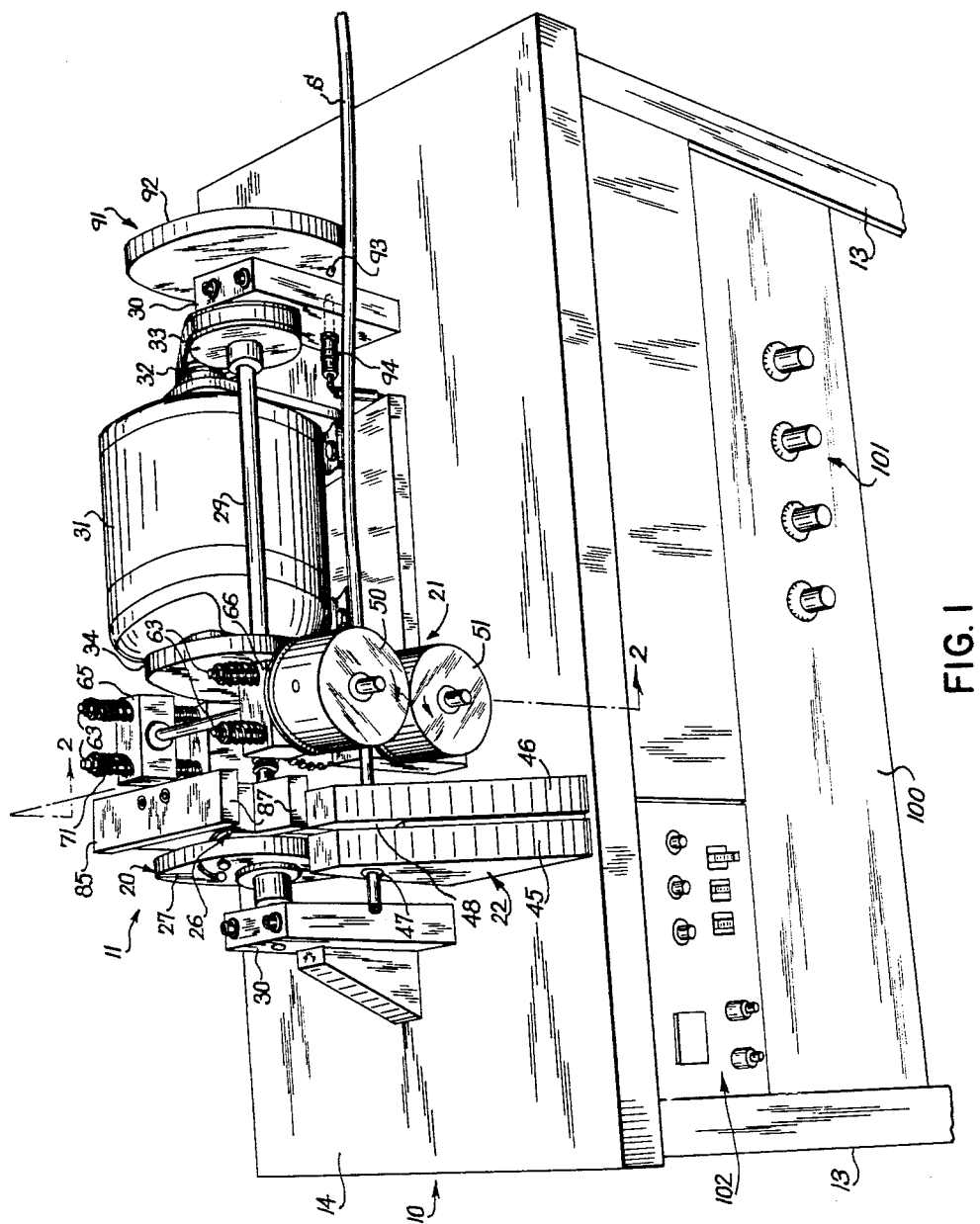
Figure 2:
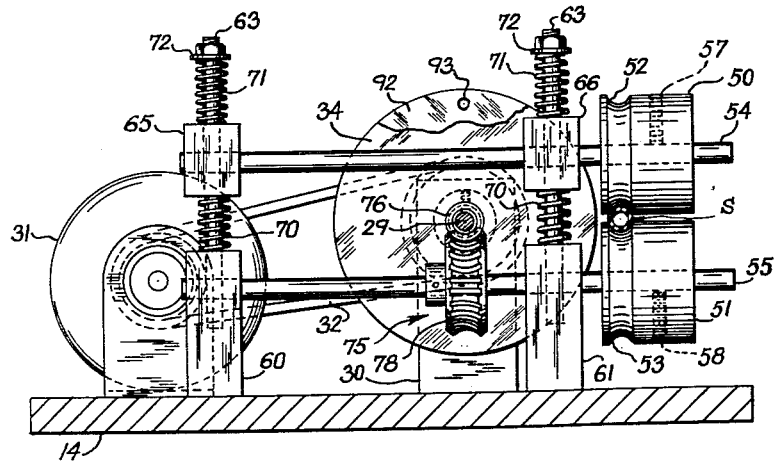
Figure 3:
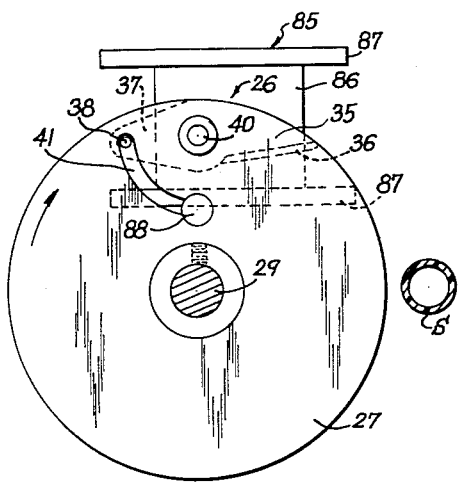
Figure 4:
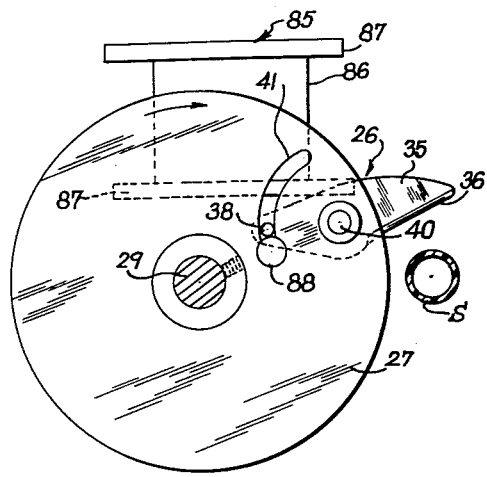

Further objects and advantages of the present invention will be apparent to those skilled in the art to which the invention relates from the following detailed description of a preferred embodiment of the invention made with reference to the accompanying drawings which form a part of this specification, and in which:

FIG. 1 is a perspective view of a cutting device embodying the present invention, FIG. 2 is a sectional view taken on section line 2—2 of FIG. 1, FIG. 3 is a side elevational view of the cutter carrying rotatable member used in the apparatus of FIG. 1 illustrating the cutting blade in its closed or inoperative position, and FIG. 4 is a view similar to FIG. 3 but illustrating the cutting blade in its open or cutting position.

The preferred embodiment of the present invention illustrated in the drawings comprises a suitable support 10 on which a cutting device 11 is mounted. The support 10 may be of any suitable construction and is illustrated as a table-like structure having legs 13 on which a support plate 14 is mounted. The cutting device 11 may be secured to the support plate 14 in any suitable manner.

The cutting device 11 cuts predetermined lengths of material in succession from a strip of material S while the strip is being advanced and includes a cutting means 20 and feeding mechanism 21 which continuously feeds the strip of material to be cut to a material holder 22 which is operatively associated with the cutting means 20 to support the material while it is being cut.

The cutting means 20 comprises a cutting blade or member 26 carried by a rotatable support or member in the nature of a disk 27. The member 27 is made of a nonmagnetic material, preferably aluminum, and is a circular disk-like structure mounted on a shaft 29 for rotation therewith, but fixed against movement in a direction parallel with shaft 29. The shaft 29 is rotatably supported by bearings located in spaced support blocks 30 and is continuously rotated by a conventional motor means 31 which turns V-belt 32. The V-belt 32 is trained around a pulley 33 which is mounted on shaft 29. The support blocks 30 are suitably secured to the plate 14 for easy detachment to change the bearings therein and provide access to the cutting mechanism 20 for servicing. A conventional flywheel 34 is also mounted on shaft 29 to provide smooth rotary movement thereof.

The cutting blade 26 includes a front portion 35 which carries a cutting edge 36 and a rear portion 37 from which a pin 38 projects. The cutting blade 26 is suitably constructed to be pivotally connected to the member 27 at a point intermediate its cutting edge 36 and the pin 38 and offset from its center of gravity toward the cutting edge.

The cutting blade 26 is pivotally mounted on the member 27 by pin 40 suitably secured in position extending through an opening in the blade 26 and an opening in the member 27 which is adjacent the periphery of member 27. Suitable bearings are used encircling the pin 40 and are held in position by some suitable clip means or alternatively a setscrew which permits the bearing and blade to be easily changed. Because of the extreme conditions under which these bearings function, it was found that these bearings should be made of a material known in the art as "nylon" 101. The blade 26 is mounted on the member 27 in such a manner that the cutting edge 36 thereof extends in a direction transverse to the axis of rotation of the member 27. The member 27 is provided with an arcuate slot 41 which receives projecting pin 38 which moves in the slot when the blade 26 pivots with respect to the member 27.

The balance of the weight of the blade 26 about pivot pin 40 is such that the rear portion 37 thereof including pin 38 is heavier than the front portion 35 and the centrifugal force provided by the rotating member 27 causes the blade 26 to locate in a closed position which is shown in FIG. 3, wherein the pin 38 is in engagement with the outer end of the slot 41, that is, the end of the slot located the farthest from the center of rotation of the member 27. In this position, it is noted that the blade 26 lies in a retracted inoperative position entirely within the periphery of the member 27, so that no portion of the blade extends radially beyond the periphery of the member 27. In order to cut the material supported by the holder 22 the blade 26 is pivoted in a counterclockwise direction about pin 40 into the position shown in FIG. 4. In this position it is noted that the portion 35 of the blade which carries cutting edge 36 is in an open or cutting position, wherein the cutting edge 36 extends radially beyond the periphery of the member 27. In this open position the blade 26 cooperates with the material holder 22 to sever the material in the path of the rotating blade.

The material holder 22, which supports the strip of material S during cutting, includes a pair of support blocks 45, 46 which are secured to the support plate 14 and which have aligned openings providing a material passageway 47 through which the strip of material is fed. Replaceable bearings are positioned in the passageway 47 to guide the material therethrough, and depending upon the cross-sectional size of the material being cut, different sized bearings may be used. A slot 48 is provided between blocks 45, 46 and the slot intersects the passageway 47 and extends perpendicular to the passageway. When the cutting blade 26 is in its open or extended position and is rotating it passes through the slot 48 and through the intersection of the slot and the passageway. Any material which extends into the passageway 47 a distance sufficient to enter the intersection of the slot and passageway is severed when the blade 26 passes therethrough.

It should be apparent that the present invention provides for high speed, precise operation, since the cutting blade is continuously rotating and the feed of the strip of material is continuous. The rotary speed of the cutting blade is preferably in excess of 1,200 feet per minute and the continuous linear feed of the material preferably is such that approximately $\frac{1}{32}$ of an inch of material is fed per revolution of the cutting blade. When the cutting blade severs the material it blocks the feed of the material for the instant of time when the cutting blade is passing through and is blocking the passageway 47. This time interval is so small since the cutting blade is traveling at a high rate of speed so that the feed of the material is not blocked in any manner which is detrimental to the operation of the device. The material, of course, will buckle or be compressed a slight amount and/ or the bearings around pin 40 will permit the blade 26 to "give" a sufficient amount during this interval since the feeding mechanism 21 will be forcing the strip to move against the blade 26, but such will not affect the accurate measurement of the material fed.

The feeding mechanism 21, which continuously feeds the strip of material into and through passageway 47 could be of any form and may include cooperating endless conveyors, however, the feeding mechanism 21 preferably comprises a pair of cooperating rollers which comprise an upper roller 50 and a lower roller 51, both of which are provided with grooves 52, 53, respectively, for receiving the strip of material S and frictionally engaging the surface of the strip S to feed the strip upon rotation of the rollers. The rollers 50, 51 are removably mounted on shafts 54, 55 by some suitable fastening means such as setscrews 57, 58, respectively, so that they may be removed from the shafts 54, 55 and replaced by other rollers having different sized and shaped grooves depending on the size and shape of the strip of material S to insure proper feeding of the material by the rollers without any "slipping" of the rollers on the material. Suitable rollers may be provided for feeding a plurality of strips simultaneously into the passageway 47 if the size thereof permits.

The shaft 55, on which the lower roller 51 is mounted, is fixedly and rotatably mounted in spaced support blocks 60, 61 which in turn are secured to support plate 14. A pair of rods 63 extend vertically from each of the support blocks 60, 61. The pair of rods 63 which extend from support block 60 have a block 65 slidably mounted thereon, and the pair of rods 63 which extend from support block 61 have a similar block 66 slidably mounted thereon. The shaft 54, on which the upper roller 50 is secured, is rotatably mounted on blocks 65, 66.

Suitable spring means are provided to insure the proper frictional engagement of the rollers 50, 51 with the strip S and to maintain the rollers 50, 51 in proper alignment. The spring means includes spiral springs 70 which bias blocks 65, 66 upwardly and are positioned encircling the portion of rods 63 between blocks 60 and 65 and blocks 61 and 66, thereby yieldingly supporting shaft 54 and in turn upper roller 50. Spiral springs 71 are also positioned encircling rods 63 and biasing blocks 65, 66 downwardly. The spring 71 are positioned between blocks 65, 66 and stop members 72 which are secured in any suitable manner to the end of rods 63 which extend above blocks 65, 66. The downward biasing force supplied by springs 71 provides the aforementioned frictional force between rollers 50, 51 and the strip of material S.

The rollers 50, 51 are rotated by a conventional drive which includes a worm gear arrangement 75. The worm gear arrangement comprises an endless screw 76 mounted on shaft 29, which extends perpendicular to shaft 55, on which roll 51 is mounted, and a cooperating gear wheel 78 secured on shaft 55. The shaft 29, as discussed above, is rotated by motor means 31, and thus it is apparent that the strip of material is continuously fed by a mechanism which is driven by the power means, that is, motor means 31, which also continuously rotates the cutting blade 26. Thus, if the drive belt 32 should slip for any reason, there would be no adverse effect on the cutting operation.

The cutting blade 26 is pivoted into its open or cutting position by an actuating means which includes an electromagnet 85 and is made of a suitable material which will properly respond when located in the magnetic field of the electromagnet 85. The electromagnet 85 comprises a coil 86 suitably supported between a pair of vertically spaced steel plates 87 and is mounted adjacent the member 27 so that upon energization the magnetic force produced thereby will pivot the blade 26 in a counterclockwise direction, since the front portion 35 of the blade will be attracted toward the topmost plate 87 and the rear portion 37 of the blade 26 will be attracted toward the lower plate 87, thereby moving the blade from its closed position shown in FIG. 3 to its open position shown in FIG. 4. This pivoting movement causes the pin 38 to move downwardly in the slot 41 and to strike the inner end of the slot 41. A suitable wear or cushioning device 88 may be provided at the lower end of the slot 41 to receive the force of the pin 38 when it strikes the inner end of the slot.

Energization of the electromagnet 85 is preferably controlled by a sensing means 91 which includes a timing wheel 92 detachably mounted on the shaft 29 for rotation therewith. The timing wheel 92 is an aluminum wheel having a steel insert 93 mounted in the side surface thereof adjacent the periphery of the wheel. A conventional magnetic pickup device 94, responsive to the passage of the steel insert 93, is positioned adjacent the wheel 92 in such a manner as to produce an electrical pulse upon each rotation of the wheel which causes the steel insert to pass the pickup device. It should be noted that the magnetic pickup device could, if properly shielded from the magnetic field produced by electromagnet 85, be positioned to be responsive to rotation of the member 27 or flywheel 34. Also, it should be noted that the pickup device would be responsive to an aluminum insert on a steel wheel which could be used, if desired.

The magnetic pickup device 94 is electrically connected to a conventional electrical counter means which receives the pulses from the pickup device 94. The counter means is of the type which may be manually set to complete a circuit after receiving a predetermined number of pulses and which automatically resets itself when the circuit which it controls is closed. This circuit is completed by actuation of a relay having instant close contacts which delay in opening, which relay maintains the circuit closed for a short period of time even though the counter has reset itself. Such a counter means is utilized in the present invention to complete a circuit to the electromagnet 85 after receiving a predetermined number of pulses from the pickup device 94 and to hold the circuit closed for a predetermined amount of time, thereby maintaining the electromagnet 85 energized for the predetermined amount of time.

The wheel 92 can be rotated relative to the member 27 when the wheel 92 is not secured to the shaft 29 and such rotation permits accurate and precise positioning of the cutting blade relative to the steel insert 93 for proper timing of the cutting operation. The member 27 and the timing wheel 92 are preferably mounted on the shaft 29 so that the cutting blade 26 on the member 27 is in position over the material to be cut when the steel insert 93 on the timing wheel 92 passes the magnetic pickup 94. Thus, all of the pulses produced by the pickup device will be received by the counter when the cutting blade is slightly above the material to be cut. Therefore, the last pulse received by the counter, which causes the counter to complete the circuit to energize electromagnet 85, is received when the cutting blade is slightly above the material to be cut. Preferably, the last pulse is received by the counter when the cutting blade is in a position from which it must rotate approximately 45° before it engages the material. Therefore, the electromagnet 85 is preferably energized to begin pivoting the blade 26 when the cutting blade is located in a position from which it must rotate 45° to engage the material to be severed.

The circuit to the electromagnet 85 is preferably maintained closed for a period of time which is sufficient for the cutting blade 26 to move through approximately 180° of rotation. While the electromagnet 85 remains energized for approximately 180° of a revolution, the cutting blade passes quickly out of the magnetic field produced by the electromagnet 85 and begins to return to its closed position after cutting. The cutting blade 26 is acted upon by the magnetic field produced by the electromagnet 85 for a time which is sufficient to permit the blade to properly sever the material. After the aforementioned 180° of rotation has taken place the circuit for energizing the electromagnet 85 is opened, thereby de-energizing the electromagnet by the action of the above mentioned relay having the contacts which delay in opening. The cutting blade will be returned to its closed position by centrifugal force so that it will not be improperly extended on its next revolution. It should be apparent that equal small predetermined lengths of material will be fed by rollers 50, 51 for each revolution of the timing wheel 92. This length is determined in part by the speed of the motor means 31 which preferably is approximately 800 revolutions per minute. An infinitely variable speed drive could be provided for shaft 29 which would permit variance of the length of material fed for each revolution of the timing wheel 92 and would permit precise cutting of practically all lengths of material.

A count of the number of revolutions of the timing wheel 92, therefore, indicates the number of the above mentioned small lengths of material that have been fed. Thus, the timing wheel 92 constitutes a device for sensing the amount of material fed by rollers 50, 51. The electromagnet which is energized after a predetermined number of revolutions by the wheel 92 is thus energized after a predetermined length of material has been fed by the rollers 50, 51.

Since the counter means is manually settable to actuate the electromagnet 85 after a predetermined number of revolutions by wheel 92, it is settable to actuate the electromagnet 85 after a predetermined length of material has been fed by rollers 50, 51. Therefore, the operator can select the length of material to be cut from the leading end of the strip S by selecting the number of revolutions that wheel 92 must make before the electromagnet 85 will be actuated.

This selection is preferably made from a control panel 100 suitably secured to the support 10 and connected to the legs 13 thereof. The control panel includes suitable dials 101 connected to the counter means in a conventional manner which are turned to select the length of material to be cut. The length of the pieces which may be cut may range from a fraction of an inch to many feet, and may be as long as 80 feet. By setting the dials 101 the operator can select the length of material which will be cut from strip S.

When a plurality of pieces of material of a similar length are desired a suitable conventional batch counter generally designated 102 is provided and controlled from the control panel 100 to indicate when the desired number of pieces has been cut. It is to be understood that the electrical power for operating the various mechanisms described may be supplied in any conventional manner and also may be controlled from the control panel 100.

Although the preferred embodiment of the present invention has been described herein with considerable detail, it is to be understood, of course, that the invention is not limited to the specific constructions shown and that it is my intention to hereby cover all adaptations, modifications and uses thereof which come within the scope of the appended claims.

Having thus described my invention, I claim:

1. In a device for cutting material into lengths, a rotatable member, means for rotating said member, a cutter member, means connecting said cutter member to said rotatable member for movement therewith and for pivotal movement relative thereto between a retracted inoperative position of its said cutting edge and an extended operative position, said axis of rotation of said cutter member relative to said rotatable member being parallel to and spaced from the axis of rotation of said rotatable member and offset from the center of gravity of said cutter member whereby said cutter member is held by centrifugal force in one of said positions upon rotation of said rotatable member, means for feeding material to be cut in a path adjacent to the path traveled by the radially outer portion of said rotatable member, electromagnetic means for rotating said cutter member about said axis of rotation of said cutter member relative to said rotatable member to move said cutter member into said other position, and means for energizing said electromagnetic means in timed relation to the feeding of material to be cut.

2. In a device for cutting material into lengths, a rotatable member, means for rotating said member, a cutter member having a cutting edge, means connecting said cutter member to said rotatable member for movement therewith and for pivotal movement relative thereto between a first position with said cutting edge in a retracted inoperative position and a second position with said cutting edge in an extended operative position, said axis of rotation of said cutter member relative to said rotatable member being parallel to and spaced from the axis of rotation of said rotatable member and offset from the center of gravity of said cutter member towards its said cutting edge whereby said cutter member is held by centrifugal force in said first position with said cutting edge in said retracted inoperative position upon rotation of said rotatable member, means for feeding material to be cut in a path parallel with the axis of rotation of said rotatable member and adjacent to the path traveled by the radially outer portion thereof, electromagnetic means for rotating said cutter member about said axis of rotation of said cutter member relative to said rotatable member to move said cutter member into said second position with said cutting edge in said extended operative position, and means for energizing said electromagnetic means in timed relation to the feeding of material to be cut.

3. In a device for cutting material into lengths, a rotatable member, means for rotating said member, a cutter member having a cutting edge, means connecting said cutter member to said rotatable member for movement therewith and for pivotal movement relative thereto between a first position with said cutting edge in a retracted inoperative position and a second position with said cutting edge in an extended operative position, said axis of rotation of said cutter member relative to said rotatable member being parallel to and spaced from the axis of rotation of said rotatable member and offset from the center of gravity of said cutter member towards its said cutting edge whereby said cutter member is held in said first position with said cutting edge in said retracted inoperative position by centrifugal force upon rotation of said rotatable member, means for feeding material to be cut in a path parallel with the axis of rotation of said rotatable member and adjacent to the path traveled by the radially outer portion thereof, electromagnetic means located adjacent to said path traveled by said rotatable member and spaced from said path along which the material to be cut is fed in the direction opposite to that in which said rotatable member is rotated for rotating said cutter member about said axis of rotation of said cutter member relative to said rotatable member to move said cutter member into said second position with said cutting edge in said extended operative position, and means for energizing said electromagnetic means in timed relation to the feeding of material to be cut.

4. In a device for cutting material into lengths, a rotatable member, means for rotating said member, a cutter member, means connecting said cutter member to said rotatable member for movement therewith and for pivotal movement relative thereto between a retracted inoperative position of its said cutting edge and an extended operative position, said axis of rotation of said cutter member relative to said rotatable member being parallel to and spaced from the axis of rotation of said rotatable member and offset from the center of gravity of said cutter member whereby said cutter member is held by centrifugal force in one of said positions upon rotation of said rotatable member, means for feeding material to be cut in a path adjacent to the path traveled by the radially outer portion of said rotatable member, electromagnetic means for rotating said cutter member about said axis of rotation of said cutter member relative to said rotatable member to move said cutter member into said other position, means operated in timed relation to the feeding of material to be cut for producing electric impulses, and means for counting said impulses and energizing said electromagnetic means after the occurrence of a predetermined number of impulses.

5. In a device for cutting material into lengths, a rotatable member, means for rotating said member, a cutter member having a cutting edge, means connecting said cutter member to said rotatable member for movement therewith and for pivotal movement relative thereto between a first position with said cutting edge in a retracted inoperative position and a second position with said cutting edge in an extended operative position, said axis of rotation of said cutter member relative to said rotatable member being parallel to and spaced from the axis of rotation of said rotatable member and offset from the center of gravity of said cutter member toward its said cutting edge whereby said cutter member is held by centrifugal force in said first position with said cutting edge in said retracted inoperative position upon rotation of said rotatable member, means for feeding material to be cut in a path parallel with the axis of rotation of said rotatable member and adjacent to the path traveled by the radially outer portion thereof, electromagnetic means for rotating said cutter member about said axis of rotation of said cutter member relative to said rotatable member to move said cutter member into said second position with said cutting edge in said extended operative position, means operated in timed relation to the feeding of material to be cut for producing electric impulses, and means for counting said impulses and energizing said electromagnetic means after the occurrence of a predetermined number of impulses.

6. In a device for cutting material into lengths, a rotatable member, means for rotating said member, a cutter member having a cutting edge, means connecting said cutter member to said rotatable member for movement therewith and for pivotal movement relative thereto between a first position with said cutting edge in a retracted inoperative position and a second position with said cutting edge in an extended operative position, said axis of rotation of said cutter member relative to said rotatable member being parallel to and spaced from the axis of rotation of said rotatable member and offset from the center of gravity of said cutter member toward its said cutting edge whereby said cutter member is held in said first position with said cutting edge in said retracted inoperative position by centrifugal force upon rotation of said rotatable member, means for feeding material to be cut in a path parallel with the axis of rotation of said rotatable member and adjacent to the path traveled by the radially outer portion thereof, electromagnetic means located adjacent to said path traveled by said rotatable member and spaced from said path along which the material to be cut is fed in the direction opposite to that in which said rotatable member is rotated for rotating said cutter member about said axis of rotation of said cutter member relative to said rotatable member to move said cutter member into said second position with said cutting edge in said extended operative position, means operated in timed relation to the feeding of material to be cut for producing electric impulses, and means for counting said impulses and energizing said electromagnetic means after the occurrence of a predetermined number of impulses.

References Cited in the file of this patent
UNITED STATES PATENTS

| | | |
|---|---|---|
| 2,343,887 | Crane | Mar. 4, 1944 |
| 2,550,146 | Gillich et al. | Apr. 24, 1951 |